United States Patent [19]

Heppner

[11] 4,066,130
[45] Jan. 3, 1978

[54] DIRT SHIELD FOR ROTO TILLER

[76] Inventor: Dedriuck Heppner, 211 Main St., Zumbro Falls, Minn. 59991

[21] Appl. No.: 698,702

[22] Filed: June 22, 1976

[51] Int. Cl.² ............................................. A01B 33/16
[52] U.S. Cl. ..................................... 172/81; 172/123; 172/509
[58] Field of Search ................. 172/112, 123, 81, 509, 172/510, 511, 512, 513, 517

[56] References Cited

U.S. PATENT DOCUMENTS

| 463,933 | 11/1891 | Armstrong | 172/511 |
|---|---|---|---|
| 503,242 | 8/1893 | Kisinger, Jr. | 172/513 |
| 1,110,048 | 9/1914 | Flint | 172/513 |
| 2,370,777 | 3/1945 | Clark | 172/112 |
| 2,582,364 | 1/1952 | Tice | 172/112 X |
| 2,959,231 | 11/1960 | Heilman | 172/512 X |
| 3,151,431 | 10/1964 | Daugherty | 172/517 X |
| 3,901,325 | 8/1975 | Richards | 172/112 X |
| 3,985,185 | 10/1976 | Pierce | 172/112 X |
| 3,985,186 | 10/1976 | Lee | 172/517 X |

Primary Examiner—Paul E. Shapiro
Attorney, Agent, or Firm—Harvey B. Jacobson; Clarence A. O'Brien

[57] ABSTRACT

A dirt shield for a rotary digger such as a roto tiller includes a shield member mounted outwardly of a rotary earthworking member rotatably mounted on the digger for keeping dirt away from plants adjacent the digger and enabling rows in a field or plot to be planted closer together. The shield member is mounted on a framework supported from the shaft of the digger and anchored to the frame of the digger by a suitable supporting element. In the conventional arrangement of a rotary digger with two or more earthworking members, a pair of shield members will be provided, one to each transverse side of the digger.

5 Claims, 5 Drawing Figures

DIRT SHIELD FOR ROTO TILLER

BACKGROUND OF THE INVENTION

1. Field of the Invention

This invention relates generally to rotary diggers, and particularly to a dirt shield for use with rotary diggers in order to prevent dirt from being thrown upon plants adjacent to a path of travel of the digger and enable rows of crops to be planted closer together.

2. Description of the Prior Art

Home gardens have been very popular down through the years, and even in today's predominantly urban society most people who have sufficient land cultivate a garden plot. This is especially true today in view of the marked increase in the price of fresh vegetables, and the like, in recent years. As a result of this interest in private garden plots, rotary diggers usually referred to as roto tillers have been developed for facilitating the cultivation of the crops. These rotary diggers are generally about the size of a power lawn mower and include, in most commercial models, two or more horizontally mounted rotary earthworking members provided with outward blade tips generally referred to as tines.

A disadvantage with these hand-steered powered cultivating devices, however, is that they tend to throw dirt outwardly in the transverse directions from the path of travel of the device. Accordingly, the crop rows must be spaced sufficiently to prevent the dirt thus thrown outwardly from covering the crops and thus damaging them.

The use of dirt shields per se with digging devices is generally known, examples of which can be found in prior U.S. Pat. Nos.: 93,362 8/3/1869, 380,998 4/10/1888, 663,494 12/11/1900, 807,349 12/12/1905.

SUMMARY OF THE INVENTION

It is an object of the present invention to provide a digger dirt shield for limiting the throw of dirt from the tines of the earthworking member or members of a rotary digger.

It is another object of the present invention to provide a dirt shield specifically intended for use with conventional rotary diggers generally referred to as roto tillers without modification of the roto tiller.

These and other objects are achieved according to the present invention by providing a dirt shield including a framework supported from the shaft of a conventional rotary digger and supporting one or more shield members disposed outwardly of the frame of the digger and oriented perpendicularly to the supporting shaft of the digger. A suitable supporting element anchors the framework onto the frame of the digger in order to keep the framework from rotating with the shaft.

A preferred construction of the framework of the dirt shield takes advantage of the fact that most commercially produced roto tillers, and the like, are provided with hollow shafts which support for rotation one or more earthworking members. Accordingly, the framework includes a pair of angle brackets each having a pair of legs, with one of the legs arranged adjustably connected to a corresponding one of the legs of the other of the brackets. The shield member or members, each of which is advantageously constructed as a substantially rectangular plate provided with a bevel in the lower forward corner thereof, are attached to the other of the legs of the brackets. A pair of pipes are connected to the other of the legs of the brackets as well, and are inserted into the hollow interior of the shaft of the digger at respective ones of the ends of the shaft for supporting the framework on the shaft. The pipes, tubes, or rods employed for insertion into the digger shaft are rotatably journaled in the other of the legs of the brackets and pinned to the digger shaft such that the pipes are retained on the shaft for rotation therewith, but can rotate relative to the brackets.

A support element including a clamping surface is connected to the angle brackets advantageously at the juncture thereof, and is provided with a clamping arrangement spaced from the clamping surface thereof and connected to the frame of the digger. When the digger has a horizontal drive shaft, the clamping arrangement is secured to, for example, a pair of ears extending upwardly from the housing of the horizontal drive shaft. When the digger has a vertical drive shaft, the clamp arrangement is secured to the housing of the drive shaft itself.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
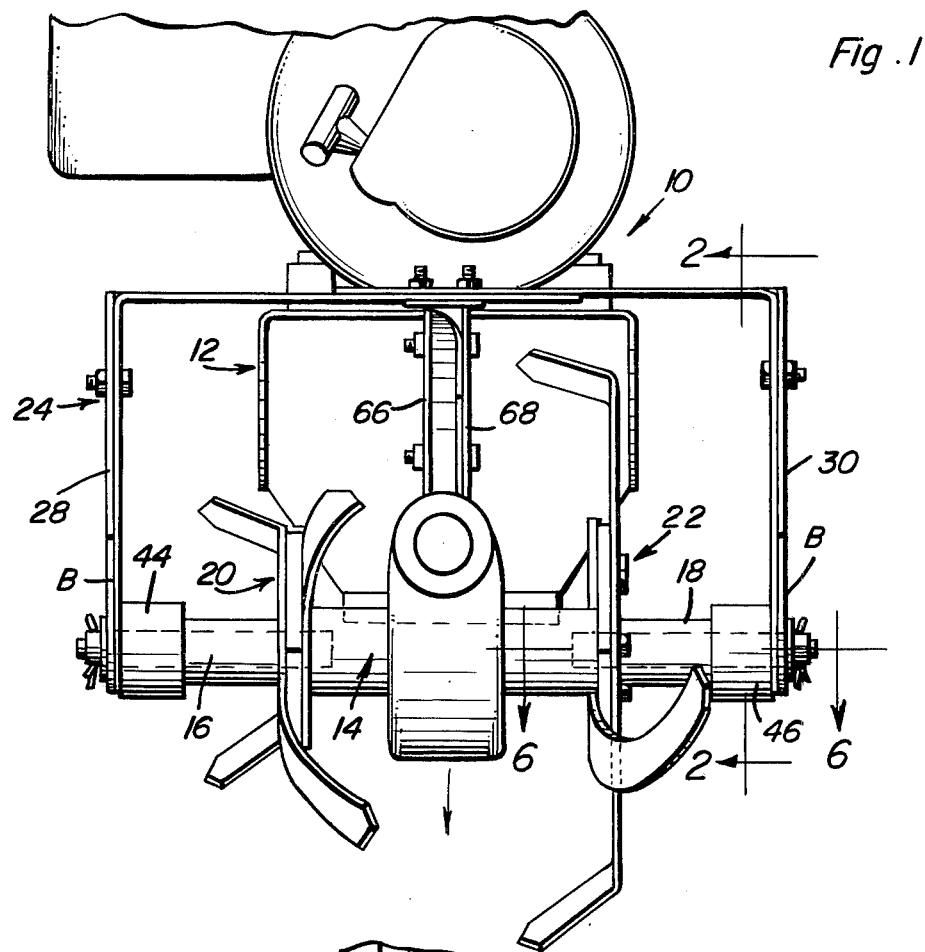
FIG. 1 is a fragmentary, front elevational view, partly cut away and in section, showing a horizontal shaft rotary digger provided with a dirt shield according to the present invention.
Figure 2:
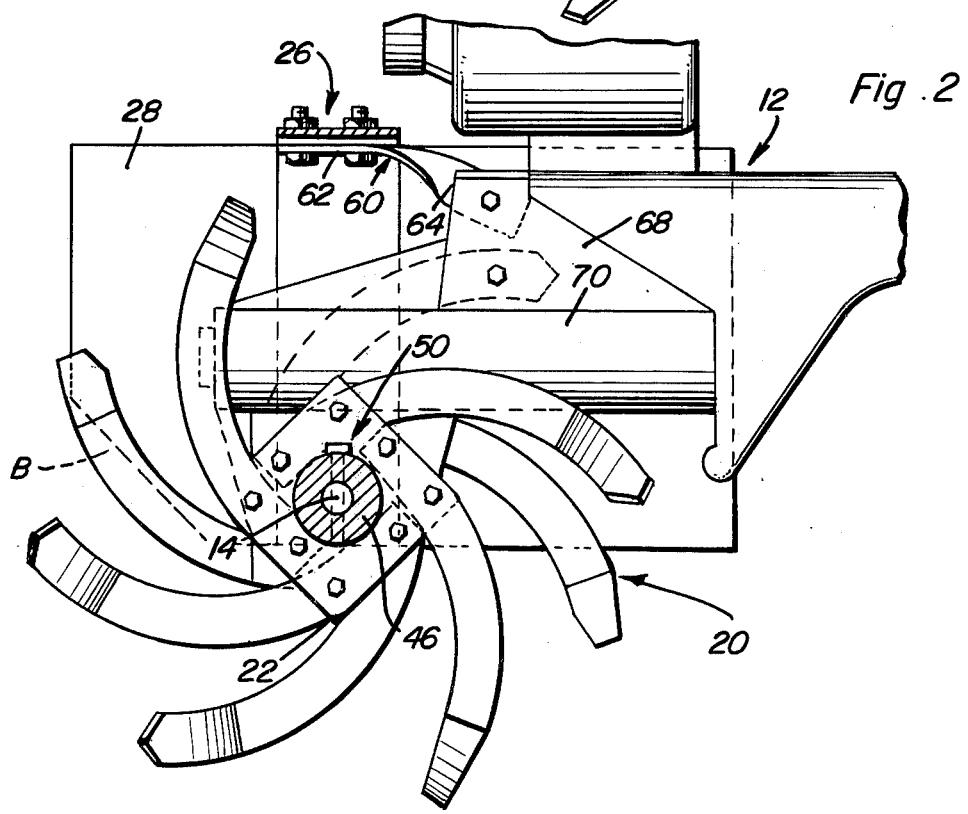
FIG. 2 is a fragmentary, sectional view taken generally along the line 2—2 of FIG. 1.

Referring now more particularly to FIGS. 1 and 2 of the drawings, a rotary digger 10 of generally conventional construction includes a ground transversing movable frame 12, and a longitudinal shaft mounted on frame 12 and disposed extending perpendicularly to a normal direction of movement of frame 12 shown by the direction arrow of FIG. 1. It will be appreciated that various conventional parts of digger 10, such as the supporting wheels, have been omitted from FIGS. 1 and 2 for the sake of clarity. Shaft 14 is provided with a pair of longitudinally spaced ends 16 and 18 on which are mounted for rotation therewith a, for example, pair of rotary earthworking members 20 and 22. Since members 20 and 22 are of conventional construction, they will not be described in detail herein. Each of the members 20 and 22 is associated with a respective one of the ends 16 and 18 of shaft 14, so that the members 20 and 22 are disposed between the drive shaft and associated transmission of digger 10 and the outwardly disposed ends 16 and 18 of shaft 14. Supported by frame 12 and shaft 14 is a dirt shield 24 according to the present invention which is disposed for keeping dirt, and the like, away from plants (not shown) and enable the rows (not shown) to be planted and cultivated closer together.

Dirt shield 24 includes a framework 26 supported from shaft 14 and including, in the illustrated embodiment, a pair of shield members 28 and 30 mounted on framework 26 outwardly of digger 10 and oriented perpendicularly to shaft 14. Preferably, the shield members 28 and 30 are each constructed from a substantially rectangular piece of plate material, such as iron or steel, with a lower corner of the shield to be disposed in the forward direction of movement or travel of frame 12 being beveled as indicated at B in order to reduce friction between the members 28 and 30 whenever same should come in contact with the ground being dug.

Figure 3:
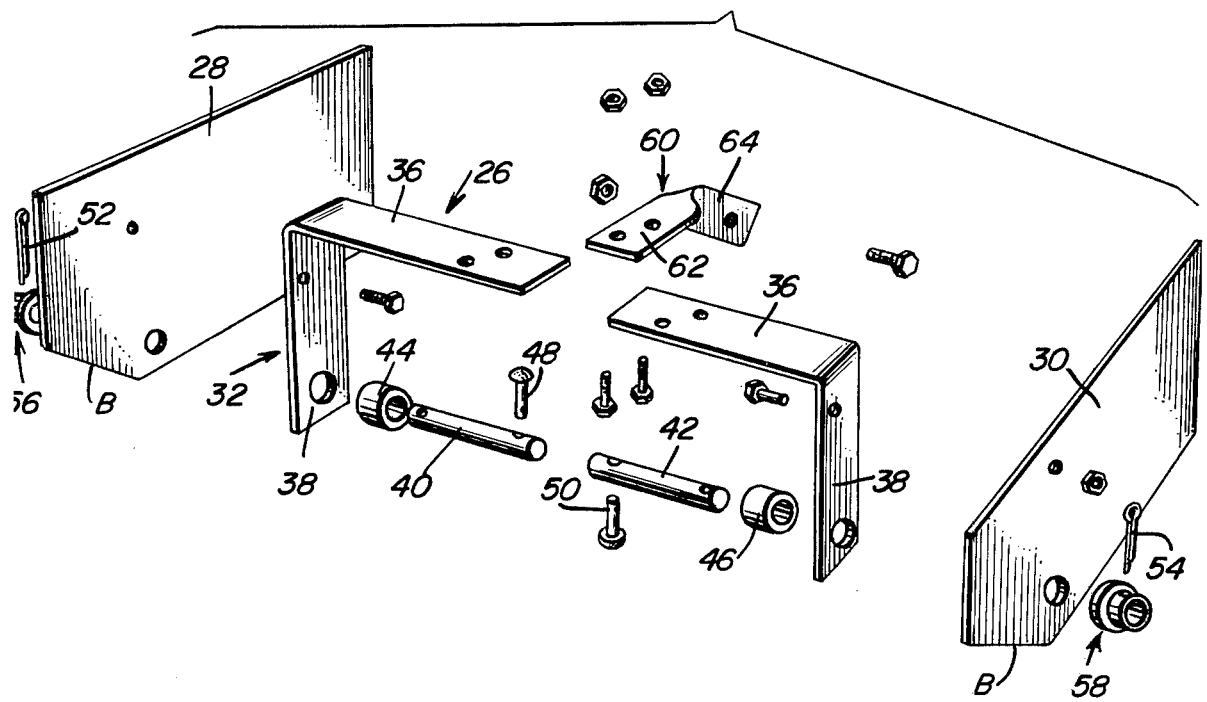
FIG. 3 is an exploded, perspective view showing a dirt shield according to the present invention.

Referring now to FIG. 3, framework 26 includes a pair of angle brackets 32 and 34 each having a pair of legs 36 and 38. Legs 36 are arranged connected to one another in a conventional manner, such as by the illustrated apertures and screw fasteners. The legs 38 have attached thereto the shield members 28 and 30 in a conventional manner, such as by the illustrated screw fasteners and the pipes 40 and 42 which support framework 26 from both of the ends 16 and 18 of shaft 14. More specifically, the tubes, rods, or pipes 40 and 42 are connected to the legs 38 of brackets 32 and 34 in a manner so as to be rotatable with respect thereto and are inserted into the hollow interior of shaft 14 at the respective ends 16 and 18 thereof. Collars 44 and 46 are disposed on the respective pipes 40 and 42 in order to space the legs 38 from the outward ends 16 and 18 of shaft 14 and to provide a bearing surface for pipes 40 and 42 against the inner surfaces of the shield members 28 and 30. Pins 48 and 50 are inserted into cooperating holes formed in pipes 40 and 42 and in shaft 14 (FIG. 2), while conventional cotter pins 52 and 54 retain conventional hubbed washers 56 and 58, and the like, on the outer ends of pipes 40 and 42 by insertion in mating apertures provided therefor in order to retain the downward ends of legs 38 on the pipes 40 and 42. Further, the cotter pins 52, 54 and associated washers 56, 58 help retain the shield members 28 and 30 on framework 26.

As will be appreciated, the manner in which the shield members 28 and 30 are disposed between collars 44, 46 and washers 56, 58 permits the associated pipes 40 and 42 to rotate relative to the stationary shield members 28 and 30.

The framework 26 further includes a support element 60 including a clamping surface 62 connected to the brackets 32, 34 preferably at the point of connection thereof and by the same screw fasteners as connect together the brackets 32. Support element 60 also includes a tongue 64 disposed at a right angle to the plane of clamping surface 62 in order to permit support element 60 to be connected to frame 12 of digger 10 as by insertion between a pair of substantially parallel ears 66 and 68 extending upwardly from the housing of a conventional horizontal drive shaft 70. While it is shaft 14 that primarily supports framework 26, it will be appreciated that the connection of framework 26 to frame 12 by means of support element 60 provides stability to the framework 26 and prevents same from moving relative to frame 12.

Figure 4:
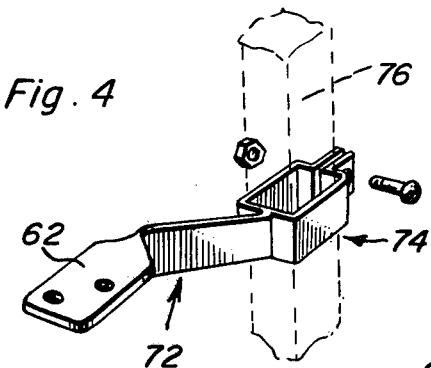
FIG. 4 is a perspective view showing a supporting element for use with a dirt shield according to the present invention particularly adapted for being secured to a vertically disposed rotary digger drive shaft of substantially rectangular cross section.
Figure 5:
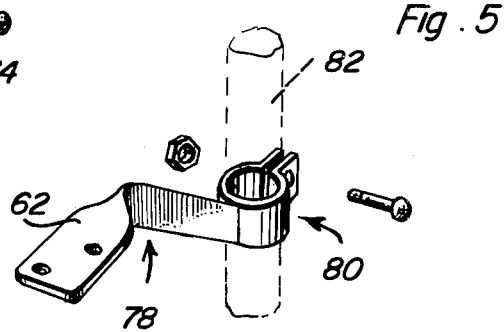
FIG. 5 is a perspective view similar to FIG. 4, but showing a supporting element for a dirt shield according to the present invention particularly adapted for being secured to a vertical rotary digger drive shaft having a substantially circular cross section.

Referring now to FIGS. 4 and 5 of the drawings, a support element 72 is shown in FIG. 4 which includes in addition to a clamping surface 62 a rectangular split clamp 74 which is arranged for being secured to a conventional vertically disposed shaft 76 having a housing of substantially rectangular cross section. Further, FIG. 5 shows a support element 78 which is provided in addition to a clamping surface 62 a circular split clamp 80 arranged for being secured to a conventional vertical drive shaft 82 of substantially circular cross section. In each of the support elements 60, 72, and 78, are provided with an intermediate portion which connects the clamping surface 62 to the tongue 64, clamp 74, or clamp 80, respectively in such a manner that the tongue 64 or clamp 74, 80 will be substantially below the level of clamping surface 62.

As will be appreciated from the above description and from the drawings, a dirt shield in accordance with the present invention is readily adaptable to conventional rotary diggers, such as roto tillers, generally without modification of the digging device. Addition of a dirt shield according to the invention to a conventional digger will permit rows of plants, and the like, to be spaced closer together because dirt from the earthworking members of the digger will be stopped by the shield members and prevented from being thrown onto adjacent plants, and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a rotary digger including a ground traversing movable frame, a longitudinal shaft mounted on the frame and disposed extending perpendicularly to a normal direction of movement of the frame, and a rotary earthworking member mounted on the shaft for rotation therewith, a dirt shield, comprising, in combination:

a. a U-shaped framework having a pair of spaced, substantially parallel legs and a connecting portion, and supported on the shaft and frame; and
   b. a shield member mounted on the framework outwardly of the digger and oriented perpendicularly to the shaft of the digger for keeping dirt away from plants adjacent the digger, the shaft of the digger including a pair of longitudinally spaced ends and a pair of rotary earthworking members mounted on the shaft and associated with the spaced ends of the shaft so as to be spaced longitudinally from one another, with the legs of the framework of the dirt shield being connected directly to the ends of the shaft of the digger and the connecting portion of the framework being rigidly attached to the frame for preventing movement of the framework relative to the frame, and the shield member being mounted on the framework outwardly of the rotary earthworking members and associated with one of the ends of the shaft.

2. A combination as defined in claim 1, wherein a pair of shield members are mounted on the framework at associated respective ends of the shaft, with the shield members being substantially rectangular pieces of plate material, a lower corner of each of the shield members being disposed directed in the forward direction of movement of the frame being provided with beveled surfaces in order to facilitate movement of the shield members through ground over which the frame of the digger is traversing.

3. A combination as defined in claim 1, wherein the framework includes, in combination:
 1. a pair of angle brackets each having one of the legs, with the brackets being connected to one another in order to form the U-shaped framework, the shield members being attached to the legs of the brackets, one of the shield members to a one of the legs, the shield members being disposed for keeping dirt away from plants and enabling rows of crops to be planted closer together; and
 2. the shaft of the digger being hollow, with a pair of pipes being connected to the legs of the brackets and inserted into the shaft at respective ones of the ends of the shaft for being supported by the shaft.

4. A combination as defined in claim 3, wherein the framework further includes:
 3. a support element including a clamping surface connected to the angle brackets and provided with a clamp means spaced from the clamping surface and connected to the frame of the digger.

5. A combination as set forth in claim 4, wherein the shield member is a substantially rectangular piece of plate material, a lower corner of the member being disposed directed in the forward direction of movement of the frame being provided with a beveled surface for facilitating movement of the shield member relative to ground over which the frame of the digger is traversing.

* * * * *